United States Patent
Simpkins et al.

(10) Patent No.: US 6,215,105 B1
(45) Date of Patent: Apr. 10, 2001

(54) ION SENSOR GLOW PLUG ASSEMBLY WITH COATING BETWEEN SHEATH AND SHELL

(75) Inventors: Haskell Simpkins, Grand Blanc; Randolph Kwok-Kin Chiu, Davison; Keith Michael Brenske, Flushing, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/375,766

(22) Filed: Aug. 18, 1999

(51) Int. Cl.⁷ .................................................. F23Q 7/00
(52) U.S. Cl. ........................... 219/270; 123/145 A
(58) Field of Search ........................ 219/270, 544, 219/260; 123/145 A, 145 R; 361/264–266

(56) References Cited

U.S. PATENT DOCUMENTS

| | | |
|---|---|---|
| 4,739,731 | 4/1988 | Habich et al. . |
| 4,786,781 * | 11/1988 | Nozaki et al. ................. 219/270 |
| 5,626,781 * | 5/1997 | Schmidt et al. ............... 219/270 |
| 5,645,742 * | 7/1997 | Schmidt et al. ............... 219/270 |
| 5,893,993 * | 4/1999 | Kurano ........................... 219/270 |
| 5,922,229 * | 7/1999 | Kurano ........................... 219/270 |

FOREIGN PATENT DOCUMENTS

| | | |
|---|---|---|
| 3706555 * | 1/1988 | (DE) . |
| 4-9517 * | 1/1992 | (JP) ............................. 219/270 |
| 10-110950 * | 4/1998 | (JP) . |
| 10-110951 * | 4/1998 | (JP) . |
| 10-110952 * | 4/1998 | (JP) . |
| 10-122114 * | 5/1998 | (JP) . |
| WO 97/38223 | 10/1997 | (WO) . |

\* cited by examiner

*Primary Examiner*—John A. Jeffery
(74) *Attorney, Agent, or Firm*—Vincent A. Cichosz

(57) ABSTRACT

An ion sensor glow plug assembly includes a shell for attachment to a cylinder head of a compression ignition engine and having a passageway extending axially therethrough. The ion sensor glow plug assembly also includes a center terminal disposed at least partially in the passageway of the shell and connected to a source of power to create a heating circuit. The ion sensor glow plug assembly includes a glow sheath disposed at least partially in the passageway of the shell and about the center wire to create an ion sensing circuit. The ion sensor glow plug assembly further includes a coating disposed about a portion of the glow sheath between the glow sheath and the shell to isolate the shell from the glow sheath.

20 Claims, 2 Drawing Sheets

ION SENSOR GLOW PLUG ASSEMBLY WITH COATING BETWEEN SHEATH AND SHELL

TECHNICAL FIELD

The present invention relates generally to glow plugs for engines and, more particularly, to an ion sensor glow plug assembly for an engine of a vehicle.

BACKGROUND OF THE INVENTION

It is known to provide an ion sensor for an engine of a vehicle. The ion sensor is used as a closed loop feedback to detect fuel injection timing and intensity of combustion in each cylinder of the engine so as to control and improve engine performance.

It is also known to provide a glow plug for a compression ignition engine such as a diesel engine. The glow plug typically has a ceramic tip that extends into a chamber of the engine. The purpose of the glow plug is to aid in cold starting of the diesel engine.

Although the above ion sensors and glow plugs have worked, it is desirable to combine the two to provide an ion sensor glow plug assembly. It is also desirable to provide an ion sensor glow plug assembly that is self-cleaning for soot in a compression ignition engine such as a diesel engine of a vehicle.

SUMMARY OF THE INVENTION

It is, therefore, one object of the present invention to provide an ion sensor glow plug assembly for an engine of a vehicle.

It is another object of the present invention to provide an ion sensor glow plug assembly that is self-cleaning for soot in a compression ignition engine of a vehicle.

To achieve the foregoing objects, the present invention is an ion sensor glow plug assembly including a metal shell for attachment to a cylinder head of a compression ignition engine and having a passageway extending axially therethrough. The ion sensor glow plug assembly also includes a center terminal disposed at least partially in the passageway of the shell and connected to a source of power to create a heating circuit. The ion sensor glow plug assembly includes a glow sheath disposed at least partially in the passageway of the shell and about the center terminal to create an ion sensing circuit. The ion sensor glow plug assembly further includes a coating disposed about a portion of the glow sheath between the glow sheath and the shell to isolate the shell from the glow sheath.

One advantage of the present invention is that an ion sensor glow plug assembly is provided for an engine of a vehicle. Another advantage of the present invention is that the ion sensor glow plug assembly is self-cleaning for soot in a compression ignition engine such as a diesel engine. Yet another advantage of the present invention is that the ion sensor glow plug assembly incorporates a carbon self-cleaning ion sensor into a glow plug. Still another advantage of the present invention is that the ion sensor glow plug assembly incorporates a metal glow sheath. A further advantage of the present invention is that the ion sensor glow plug assembly allows closed loop control of a compression ignition engine such as a diesel engine.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
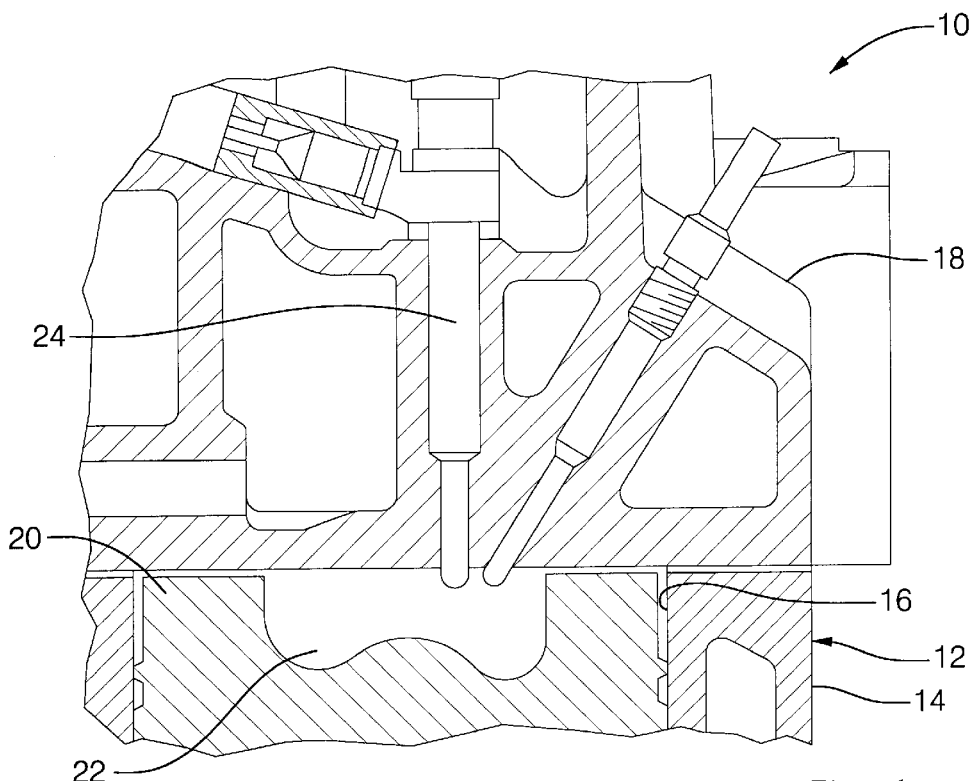
FIG. 1 is a fragmentary elevational view of an ion sensor glow plug assembly, according to the present invention, illustrated in operational relationship with an engine of a vehicle.
Figure 2:
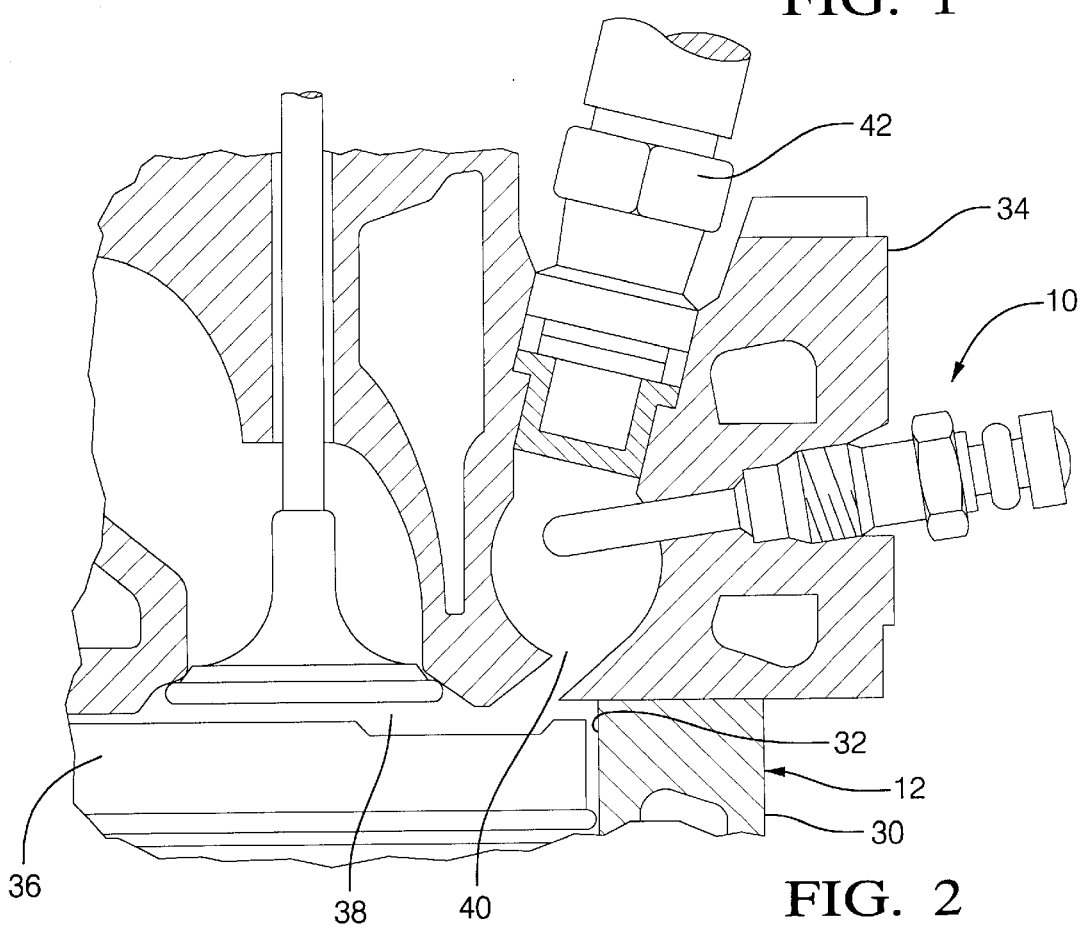
FIG. 2 is a view similar to FIG. 1 of the ion sensor glow plug assembly illustrated in operational relationship with another engine.

Referring to the drawings and in particular FIGS. 1 and 2, one embodiment of an ion sensor glow plug assembly 10, according to the present invention, is shown for a compression ignition engine, generally indicated at 12, such as a diesel engine in a vehicle (not shown). As illustrated in FIG. 1, the compression ignition engine 12 may be an open chamber type diesel engine including a cylinder block 14 defining a cylinder 16 closed by a cylinder head 18. The compression ignition engine 12 also includes a piston 20 reciprocal in the cylinder 16 and defines a recessed bowl, which together with the cylinder head 18 forms a combustion chamber 22. The compression ignition engine 12 includes an injection nozzle or injector 24 mounted in the cylinder head 18 which sprays fuel into the combustion chamber 22 for compression ignition therein. The compression ignition engine 12 further includes the ion sensor glow plug assembly 10 mounted in the cylinder head 18 and extending into the combustion chamber 22 for a function to be described. It should be appreciated that, except for the ion sensor glow plug assembly 10, the compression ignition engine 12 is conventional and known in the art.

As illustrated in FIG. 2, the compression ignition engine 12 may be pre-chamber type diesel engine including a cylinder block 30 defining a cylinder 32 closed by a cylinder head 34. The compression ignition engine 12 also includes a piston 36 reciprocal in the cylinder 32. The piston 36 and cylinder head 34 form a combustion chamber 38, which connects with a pre-combustion chamber or pre-chamber 40 within the cylinder head 34. The compression ignition engine 12 includes an injection nozzle or injector 42 mounted in the cylinder head 34 for injecting fuel into the pre-chamber 40. The compression ignition engine 12 includes the ion sensor glow plug assembly 10 mounted in the cylinder head 34 and extending into the pre-chamber 40 for a function to be described. It should be appreciated that, except for the ion sensor glow plug assembly 10, the compression ignition engine 12 is conventional and known in the art.

Figure 3:
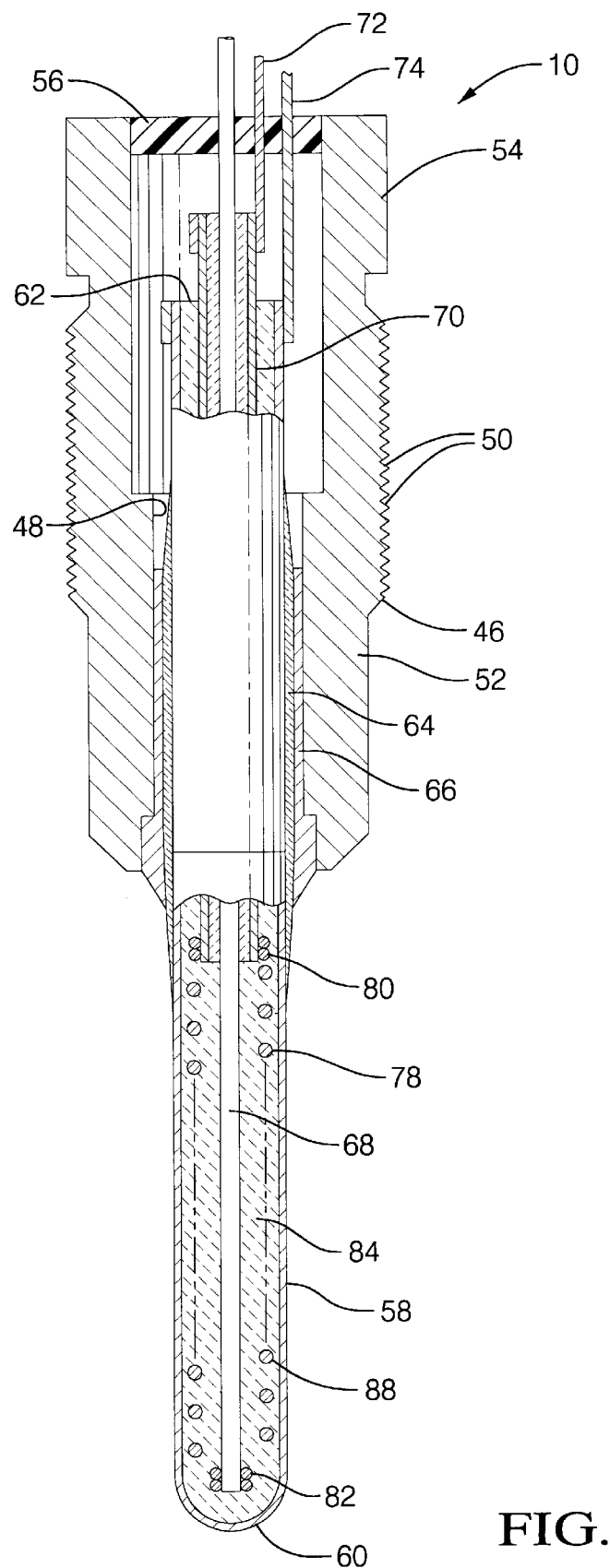
FIG. 3 is a fragmentary elevational view of the ion sensor glow plug assembly of FIGS. 1 and 2.

Referring to FIG. 3, the ion sensor glow plug assembly 10 includes a housing or shell 46 extending axially for engaging the cylinder head 18, 34. The shell 46 is generally cylindrical in shape and has a passageway 48 extending axially therethrough. The shell 46 has a plurality of exterior threads 50 for threaded engagement with the cylinder head 18, 34. The exterior threads 50 are of a ten-millimeter (10 mm) by one millimeter (1 mm) type. The shell 46 has a reduced diameter end 52 adjacent one end of the exterior threads 50 and a hexagonal shaped end 54 adjacent the other end of the exterior threads 50 for a function to be described. The hexagonal shaped end 54 is of a ten millimeter (10 mm) type. The shell 46 is made of a metal material such as steel.

The ion sensor glow plug assembly 10 may include a seal 56 disposed partially in the passageway 48 at the hexagonal shaped end 54 of the shell 46 and an electrical connector (not shown) disposed adjacent the seal 56 for a function to be described. The seal 56 is made of either a plastic or elastomeric material. It should be appreciated that the electrical connector is conventional and known in the art.

The ion sensor glow plug assembly 10 includes a glow sheath 58 partially disposed in the passageway 48 of the shell 46. The glow sheath 58 is generally cylindrical and tubular in shape. The glow sheath 58 has a closed end 60 spaced axially from the reduced diameter end 52 of the shell 46. The glow sheath 58 extends axially from the closed end 60 into the passageway 48 of the shell 46 to an open end 62. The glow sheath 58 has a predetermined outer diameter of approximately 3.5 mm to approximately 5.0 mm. The glow sheath 58 is made of a metal material such as Inconel 601 or 600. The glow sheath 58 is secured by suitable means such as a press-fit into the shell 46.

The ion sensor glow plug assembly 10 also includes an first coating 64 on a portion of the glow sheath 58 that is partially disposed in the shell 46 and extending into the passageway 48. The first coating 64 is disposed annularly about the glow sheath 58 and extends radially and axially. The first coating 64 has one end spaced from the open end 62 of the glow sheath 58 and extends axially past the reduced diameter end 52 of the shell 46 into the glow area of the glow sheath 58. The first coating 64 has a radial thickness of 0.002 inches to 0.010 inches. The first coating 64 is made of an insulating material such as alumina ($Al_2O_3$) or other ceramic material. The first coating 64 is extended into the glow area of a glow sheath 58 to burn off, by glowing, any soot (carbon) and moisture formation on the glow sheath 58 that may create reduced resistance between the shell 46 and glow sheath 58. It should be appreciated that the first coating 64 isolates the glow sheath 58 from the shell 46, thus creating an ion sensing circuit, and retains a resistance sufficient for ion sensing during glowing and/or engine operation.

The ion sensor glow plug assembly 10 includes a second or conformal coating 66 disposed over a portion of the first coating 64. The second coating 66 is a relatively thin layer to mechanically retain the glow sheath 58 in the shell 46. The second coating 66 is made of a high temperature material such as polyamides, silicones or the like having high resistivity at high temperature such as four hundred degrees centigrade (400° C.). It should be appreciated that the second coating 66 can be cured before or after final assembly. It should also be appreciated that the second coating 66 prevents moisture formation between the glow sheath 58 and shell 46 and seals off combustion gases from passing between the first coating 64 and the shell 46.

The ion sensor glow plug assembly 10 includes a center or centerwire terminal 68 disposed within the glow sheath 58. The center terminal 68 is generally a metal wire and extends axially. The center terminal 68 has one end spaced axially from the closed end 60 of the glow sheath 58 and extends axially through the passageway 48 to another end that matingly engages the electrical connector. The center terminal 68 is made of a metal material such as nickel (Ni), nickel-chromium (Ni—Cr) or nickel-chromium-iron (Ni—Cr—Fe). It should be appreciated that the center terminal 68 is a first heater terminal for heater portion 82 of an electrical coil 78 to be described.

The ion sensor glow plug assembly 10 includes an inner or coaxial tube 70 disposed about a portion of the center terminal 68. The inner tube 70 has one end spaced a predetermined distance such as fifty (50) to eighty (80) millimeters (mm) from the closed end 60 of the glow sheath 58. The inner tube 70 extends axially to a second end spaced a predetermined distance from the seal 56. The inner tube 70 is made of a metal material such as nickel (Ni) or the like. It should be appreciated that the inner tube 70 is spaced radially from the center terminal 68. It should also be appreciated that the predetermined distance is a high temperature glow area or glow tip of the glow sheath 58.

The ion sensor glow plug assembly 10 includes a second terminal 72 extending through the seal 56 and attached to the inner tube 70 by suitable means such as welding. The second terminal 72 matingly engages the electrical connector. The ion sensor glow plug assembly 10 also includes an ion sensor terminal 74 extending through the seal 56 and attached to the glow sheath 58 by suitable means such as welding. The ion sensor terminal 74 matingly engages the electrical connector. It should further be appreciated that the inner tube 70 and second terminal 72 are a second heater terminal for the heater portion 82 of the electrical coil 78 to be described.

The ion sensor glow plug assembly 10 includes an electrical coil 78 disposed about a portion of the center terminal 68. The electrical coil 78 has a first or current regulating portion 80 having one end disposed about the inner tube 70 and extending axially. The current regulating portion 80 is made of a metal material such as nickel-iron (Ni—Fe) or cobalt-iron (Co—Fe). The electrical coil 78 has a second or heating portion 82 disposed about the end of the center terminal 68. The heating portion 82 has one end connected to the current regulating portion 80 by suitable means such as spot welding and another end connected to the end of the center terminal 68 by suitable means such as spot welding. The heating portion 82 is made of a metal material such as nickel-chromium (Ni—Cr) or iron-chromium-aluminum (Fe—Cr—Al). It should be appreciated that the inner tube 70 and second terminal 72 and center terminal 68 act as terminals for the electrical coil 78 to create a heating circuit and are connected to the electrical connector, which, in turn, is connected to an electronic controller (not shown). It should be appreciated that the controller is conventional and known in the art.

The ion sensor glow plug assembly 10 further includes a filling material 84 disposed in the glow sheath 58 and inner tube 70. The filling material 84 is made of a ceramic material such as magnesia or alumina. The filling material 84 is a plurality of ceramic tubes disposed in the open end of the glow sheath 58 and inner tube 70 which are crushed to fill the glow sheath 58 and inner tube 70. The filling material 84 is disposed between the electrical coil 78 and center terminal 68 and between the inner tube 70 and center terminal 68 and between the inner tube 70 and glow sheath 58. The filling material 84 provides mechanical support of the center terminal 68, electrical coil 78 and inner tube 70 in an x-y direction. The filling material 84 also acts as a heat conductor from the electrical coil 78 to the glow sheath 58 during glowing.

To assemble the ion sensor glow plug assembly 10, the heating portion 82 of the electrical coil 78 is joined such as by welding to the current regulating portion 80 of the electrical coil 78. The heating portion 82 is then joined such as by welding to the center terminal 68, which is the first heater terminal. The current regulating portion 80 of the electrical coil 78 is joined such as by welding to the inner tube 70, which is the second heater terminal. Crushable ceramic tubes, made of magnesia or alumina, are then inserted to the inside and outside of the terminals/electrical coil 78, which is, in turn, inserted into the glow sheath 58.

The glow sheath 58 is then swaged to a smaller size to crush and compact the crushable tubes to form the filler material 84 for electrical insulation and for thermal conductivity between the center terminal 68, electrical coil 78 and glow sheath 58. The outer diameter of the glow sheath 58 is then impregnated with the first coating 64 using conventional Plasma Jet, High Velocity Oxy-Fuel (HVOF) or D-Gun® molten particle deposition processes. Next, a thin second coating 66 is applied over the first coating 64. The second terminal 72 is attached to the inner tube 70 by suitable means such as welding. The ion sensor terminal 74 is attached to the glow sheath 58 by suitable means such as welding. The glow sheath 58 is then mechanically retained such as by being press-fitted into the shell 46 through its lower end. The seal 56 is then inserted into the upper or open end of the passageway 48 of the shell 46. The ion sensor glow plug assembly 10 may be heated before or after final assembly to cure the second coating 66. The ion sensor glow plug assembly 10 is then completely assembled.

In operation of the ion sensor glow plug assembly 10, current flows from the electrical connector to the center terminal 68, which passes through the heating portion 82 and current regulating portion 80 of the electrical coil 78, inner tube 70 and second terminal 72 back to the electrical connector to form a glow plug circuit. The ion sensor terminal 74 and glow sheath 58 carry the supply voltage from the electrical connector for the ion sensor circuit. When there is combustion in the cylinder 16, 32, the burnt gases are ionized and conduct or carry current from the electrical connector through the ion sensor terminal 74 to the glow sheath 58 and through the ionized gas to an engine ground, which is the piston 22, 36 or the shell 46. The exposed portion of the first coating 64 is extended into the high temperature area or glowing area of the glow sheath 58 which will burn off, by glowing, any soot and moisture formation on the glow sheath 58 that may create a short between the glow sheath 58 and the shell 46 to provide the soot self-cleaning feature of the ion sensor glow plug assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is clamed is:

1. An ion sensor glow plug assembly comprising:
   a shell for attachment to a cylinder head of a compression ignition engine and having a passageway extending axially therethrough;
   a center terminal disposed at least partially in said passageway of said shell and connected to a source of power to create a heating circuit;
   a glow sheath disposed at least partially in said passageway of said shell and about said center terminal to create an ion sensing circuit; and
   a coating disposed about a portion of said glow sheath between said glow sheath and said shell to isolate said shell from said glow sheath.

2. An ion sensor glow plug assembly as set forth in claim 1 including a second coating disposed over said first coating.

3. An ion sensor glow plug assembly as set forth in claim 1 wherein said glow sheath has a closed end spaced from an end of said center terminal.

4. An ion sensor glow plug assembly as set forth in claim 1 including an electrical coil disposed about a portion of said center terminal.

5. An ion sensor glow plug assembly as set forth in claim 4 wherein said electrical coil has a heating portion connected to said center terminal and a current regulating portion connected to said heating portion.

6. An ion sensor glow plug assembly as set forth in claim 4 including an inner tube disposed about a portion of said center terminal and connected to said electrical coil.

7. An ion sensor glow plug assembly as set forth in claim 6 including a second terminal attached to said inner tube and a source of power.

8. An ion sensor glow plug assembly as set forth in claim 1 including an ion sensor terminal connected to said glow sheath and a source of power.

9. An ion sensor glow plug assembly as set forth in claim 1 wherein said first coating is made of an insulative material.

10. An ion sensor glow plug assembly as set forth in claim 1 including a filling material disposed between said glow sheath and said center terminal.

11. An ion sensor glow plug assembly as set forth in claim 1 wherein said center terminal is made of a metal material.

12. A self-cleaning ion sensor glow plug assembly for a compression ignition engine comprising:
    a shell for attachment to a cylinder head of the compressive ignition engine and having a passageway extending axially therethrough;
    a metal center terminal disposed at least partially in said passageway of said shell and connected to a source of power to create a heating circuit;
    a glow sheath disposed at least partially in said passageway of said shell and about said metal center wire;
    an ion sensor terminal attached to said glow sheath and a source of power to create an ion sensing circuit; and
    a first coating disposed about a portion of said glow sheath and at least partially in said passageway of said shell and extending axially therefrom to clean off soot on said glow sheath.

13. A self-cleaning ion sensor glow plug assembly as set forth in claim 12 wherein said glow sheath has a closed end spaced from an end of said metal center terminal.

14. A self-cleaning ion sensor glow plug assembly as set forth in claim 12 including an electrical coil disposed about a portion of said metal center terminal.

15. A self-cleaning ion sensor glow plug assembly as set forth in claim 14 wherein said electrical coil has a heating portion connected to said metal center terminal and a current regulating portion connected to aid heating portion.

16. A self-cleaning ion sensor glow plug assembly as set forth in claim 15 including an inner tube disposed about a portion of said metal center terminal and connected to said electrical coil.

17. A self-cleaning ion sensor glow plug assembly as set forth in claim 12 including a second terminal connected to said inner tube and a source of power.

18. A self-cleaning ion sensor glow plug assembly as set forth in claim 12 including a second coating disposed over a portion of said first coating to retain said glow sheath within said passageway of said shell.

19. A self-cleaning ion sensor glow plug assembly as set forth in claim 12 including a filling material disposed between said glow sheath and said metal center terminal.

20. A self-cleaning ion sensor glow plug assembly for a diesel engine comprising:
    a metal shell for attachment to a cylinder head of a compressive ignition engine and having a passageway extending axially therethrough;

a metal center terminal disposed at least partially in said passageway of said and connected to a source of power;

a glow sheath disposed at least partially in said passageway of said shell and about said metal center terminal;

a first coating disposed about a portion of said glow sheath and at least partially in said passageway of said shell and extending axially therefrom to clean off soot on said glow sheath;

an electrical coil disposed about a portion of said metal center terminal having a heating portion connected to said metal center terminal and a current regulating portion connected to said heating portion;

an inner tube disposed about a portion of said metal center terminal and connected to said current regulating portion;

a heater terminal attached to said inner tube and to a source of power; and an ion sensor terminal attached to said glow sheath and a source of power to create an ion sensing circuit.

* * * * *